(12) United States Patent
Jensen et al.

(10) Patent No.: US 8,193,755 B2
(45) Date of Patent: Jun. 5, 2012

(54) ACTUATOR

(75) Inventors: Svend Erik Knudsen Jensen, Sønderborg (DK); John Abrahamsen, Nordborg (DK)

(73) Assignee: Linak A/S, Nordborg (DK)

( * ) Notice: Subject to any disclaimer, the term of this patent is extended or adjusted under 35 U.S.C. 154(b) by 717 days.

(21) Appl. No.: 12/308,113

(22) PCT Filed: Jun. 13, 2007

(86) PCT No.: PCT/DK2007/000287
§ 371 (c)(1),
(2), (4) Date: Dec. 8, 2008

(87) PCT Pub. No.: WO2007/143998
PCT Pub. Date: Dec. 21, 2007

(65) Prior Publication Data
US 2009/0193917 A1    Aug. 6, 2009

(30) Foreign Application Priority Data
Jun. 13, 2006   (DK) ................................ 2006 00797

(51) Int. Cl.
*F16H 25/24* (2006.01)
*F16H 27/02* (2006.01)
*H02P 3/00* (2006.01)

(52) U.S. Cl. ........ 318/687; 318/135; 318/119; 318/375; 74/89.23; 74/89.39

(58) Field of Classification Search .................. 318/686, 318/687, 38, 135, 119; 74/22 R, 89, 89.23, 74/89.32; 310/316.01, 317, 318; 475/317; 192/223.4, 12 BA, 56.2, 150
See application file for complete search history.

(56) References Cited

U.S. PATENT DOCUMENTS

| 4,158,797 | A | | 6/1979 | Alcott |
| 5,394,069 | A | | 2/1995 | Danielson et al. |
| 5,847,522 | A | | 12/1998 | Barba |
| 5,957,798 | A | * | 9/1999 | Smith et al. ....................... 475/5 |
| 6,158,295 | A | | 12/2000 | Nielsen |
| 6,539,566 | B1 | * | 4/2003 | Hayes ............................... 5/618 |

(Continued)

FOREIGN PATENT DOCUMENTS

DE    19637039    11/1997
(Continued)

OTHER PUBLICATIONS

English Abstract of DE19637039.

*Primary Examiner* — Eduardo Colon Santana
(74) *Attorney, Agent, or Firm* — Dykema Gossett PLLC

(57) ABSTRACT

An actuator comprising a reversible electric motor, which over a gearing, drives an activation element which can move back and forth. The activation element is of the non-self-locking type. Furthermore the motor and gearing are of a non self locking type. A brake holds the activation element in any position, when the electric motor is inactive, said brake can be released by means of a release mechanism. The motor is used as generator when the brake is released and the generator voltage from it is used to adjust the velocity of the activation element. Thus, a quick release is provided, where the activation element can be disengaged and adjusted evading gear and motor, and where the movement of the activation element, during the disengagement, occurs with a controlled velocity.

14 Claims, 5 Drawing Sheets

U.S. PATENT DOCUMENTS

| | | | |
|---|---|---|---|
| 6,739,004 B1 | 5/2004 | Abrahamsen et al. | |
| 6,791,215 B2 * | 9/2004 | Tesar | 310/12.24 |
| 7,047,834 B2 * | 5/2006 | Nielsen et al. | 74/89.38 |
| 7,049,728 B2 * | 5/2006 | Bastholm | 310/317 |
| 2004/0007923 A1 * | 1/2004 | Tesar | 310/12 |
| 2004/0194564 A1 * | 10/2004 | Nielsen et al. | 74/64 |
| 2005/0012430 A1 * | 1/2005 | Bastholm | 310/311 |
| 2005/0017600 A1 | 1/2005 | Nomerange | |
| 2005/0168084 A1 * | 8/2005 | Tesar | 310/80 |
| 2009/0133519 A1 * | 5/2009 | Lorenzen | 74/89.32 |
| 2010/0025124 A1 * | 2/2010 | Arpino | 180/19.3 |
| 2010/0212087 A1 * | 8/2010 | Leib et al. | 5/81.1 R |
| 2011/0043062 A1 * | 2/2011 | Lorenzen | 310/83 |

FOREIGN PATENT DOCUMENTS

| | | |
|---|---|---|
| EP | 577541 A1 * | 1/1994 |
| EP | 0685662 | 12/1995 |

* cited by examiner

ACTUATOR

BACKGROUND OF THE INVENTION

1. Field of the Invention

The present invention relates to an actuator with a quick release capability.

2. The Prior Art

For the sake of convenience, the description of the invention departs from linear actuators of the type comprising a spindle, which over a gearing, is driven by an electric motor, and where the activation element is a tubular rod carried by a spindle nut. It is, however, to be understood that the invention also applies to rotary actuators for instance of the type dealt with in WO 01/17401 A1 to Linak A/S A quick release in an actuator is used for temporary interruption of the connection to the part of transmission with a high inertia and motor so that the activation element, which is of the non-self-locking type, under its load on its own momentary moves back to its initial position, alternatively can be adjusted manually. As an example of where a quick release is used, reference is made to hospital and care beds, patient lifters and certain types of gates, doors and windows and other constructions, where it is important if not vital to be able to make a momentary adjustment of the activation element.

Actuators with quick release are for instance known from EP 685 662 B1 and EP 577 541 B1 to Linak A/S. The first publication deals with a quick release based on two cylindrical elements wound with an disengageable clutch spring. The other publication deals with a quick release with two bevel gear wheels, where one gear wheel can be displaced out of engagement.

By quick releases there is, however, in many situations a risk that the construction, the load and the possible patient carried by the actuator may be damaged as a result of the collision-like impact which occurs when the activation element hits a mechanical end stop in the end position. That the collision is intense is due to the fact that the activation element under influence of the load executes an accelerated movement and typically into a more or less rigid mechanical stop.

A simple structure is, however, known from WO 98/30816 to Linak A/S, where the velocity can be controlled during the release of the quick release. This quick release is based on a clutch spring in the form of a coil spring, which rests tightly against a cylindrical element. By releasing the spring in a controlled manner it can be achieved that it is brought more or less out of engagement with the cylindrical element and thus controlling the velocity. The construction is as far as it goes fine, but it is voluminous, and has several components, and it can be difficult to control the velocity accurately.

The purpose of the invention is to provide an actuator with a simplified quick release with controlling of the velocity during the disengagement.

SUMMARY OF THE INVENTION

This is achieved according to the invention, the activation element, motor and gearing are of a non-self-locking type, so that these are brought to move as a result of the load on the activation element. For holding the activation element in any position under normal circumstances, the actuator comprises a brake. Various types of brakes may be used—mechanically or electrically working. By releasing the brake, the moveable elements of the actuator are set in motion, at which the motor will work as a generator. The electrical voltage, generator voltage, which arises by it and grows proportionally with the velocity, is used to control the velocity of the activation element. This can be done in various ways, for instance with an electrically activated brake. A particular simple way is, however, to load the motor by short-circuiting it. The load of the motor can be a fixed resistive or a PWM load. By short-circuiting it to a larger or lesser extent a larger or lesser velocity is achieved. For controlling when the braking should begin working, a small electrical circuit may be provided, which activates the braking when the generator voltages exceeds a certain level, for instance in the area of 28-34 volts. This limit can be determined by a transistor, for instance a FET in the circuit. It is understood that the activation element runs against an end stop at a predetermined velocity. It is noted that the velocity, however, can vary within certain limits depending on the specific circumstances. It is, however, also possible to change the velocity during the course by inserting a potentiometer in the circuit, so that the voltage and with it the velocity can be varied. A particular powerful braking effect can be obtained by not only short-circuiting the motor when certain conditions for velocity is fulfilled, but even applying a, compared to the generated voltage, negative voltage to the motor.

The invention will be explained more fully below with reference to the accompanying drawings.

DETAILED DESCRIPTION OF THE PREFERRED EMBODIMENTS

Figure 1:
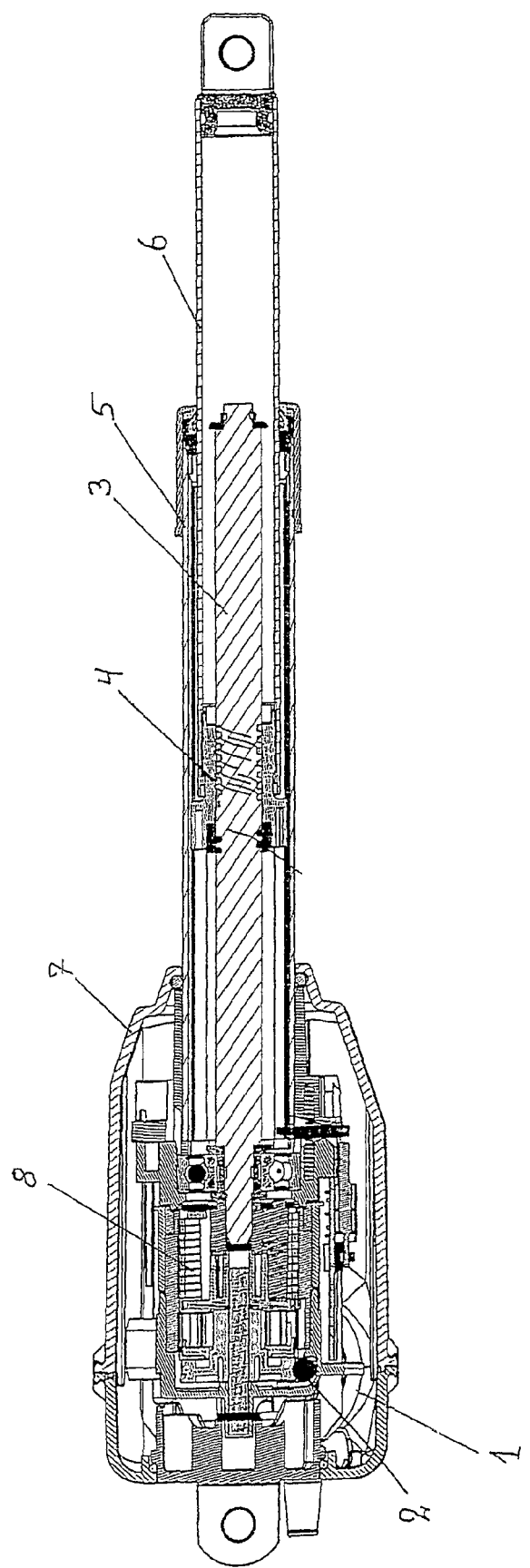
FIG. 1 shows a sectional view through a linear actuator according to the invention.

The actuator shown in FIG. 1 comprises a housing with a reversible low voltage DC-motor 1, which over a worm gear 2 drives a spindle 3. On the spindle is a spindle nut 4, to which an activation element 6 in the form of a tubular rod guided in an outer tube 5 is secured, said outer tube having one end embedded in the housing 7. By preventing the spindle from rotating, the activation element will be moved back and forth depending on the direction of rotation of the motor.

Motor, worm gear and spindle are non-self-locking, which means that a load on the activation element will as a result of the pressure on the spindle nut bring the spindle and with that the worm gear and also the rotor of the motor into rotation.

In order to hold the activation element in any position when the current for the motor is interrupted, the actuator is equipped with a brake 8 in the form of a coil spring, which is released with a release mechanism. When the brake is released, the activation element will, as already mentioned, be able to move freely. When the rotor of the motor is thus set in rotation it will work as a generator and by increasing velocity a continuously higher voltage will be generated. This voltage will have opposite polarity compared to the voltage applied to the motor in order to move the activation element away from the initial position. That the motor works as generator is used for controlling the velocity of the activation element.

The controlling can be brought about in various ways, either directly by using the generated voltage or by using changes in the internal parameters of the motor.

Figure 2:
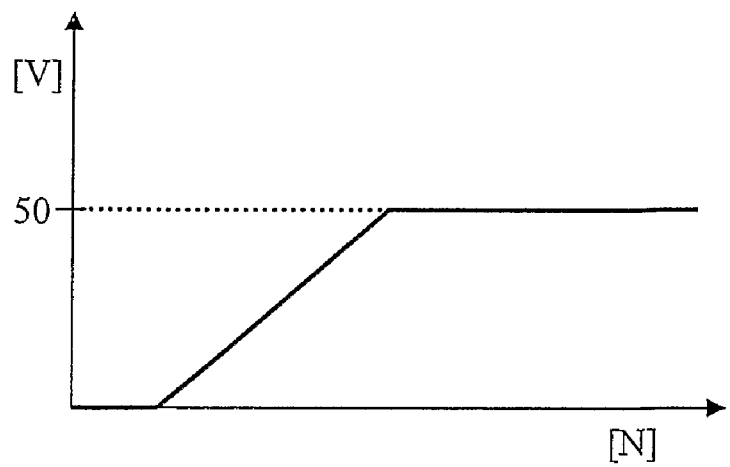
FIG. 2 shows a threshold voltage for a motor brake.
Figure 3:
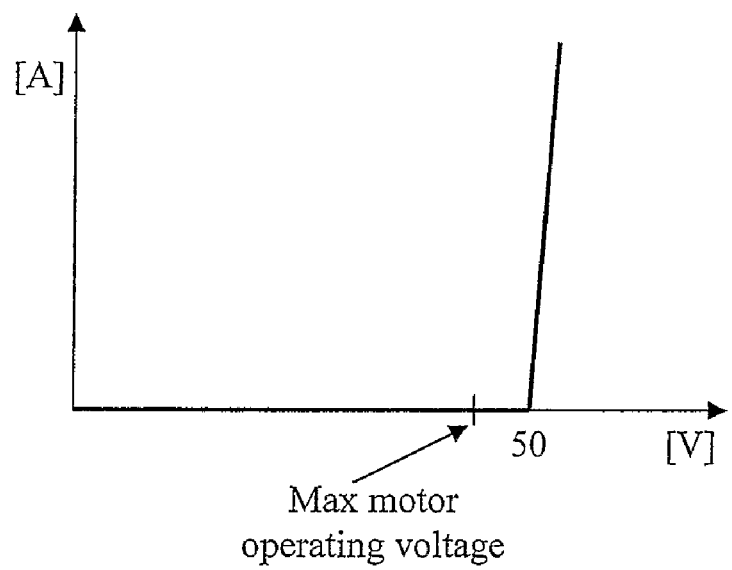
FIG. 3 shows relation between the normal operating voltage and the motor brake voltage of the system.
Figure 5:
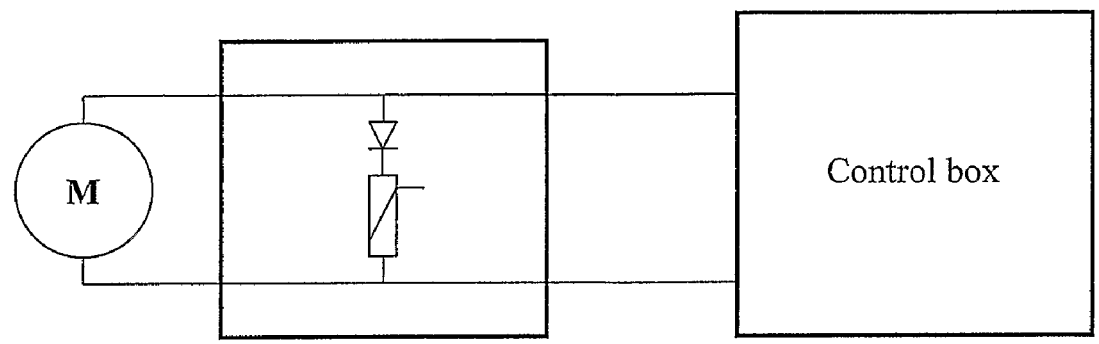
FIG. 5 shows an overview of an actuator system.
Figure 7:
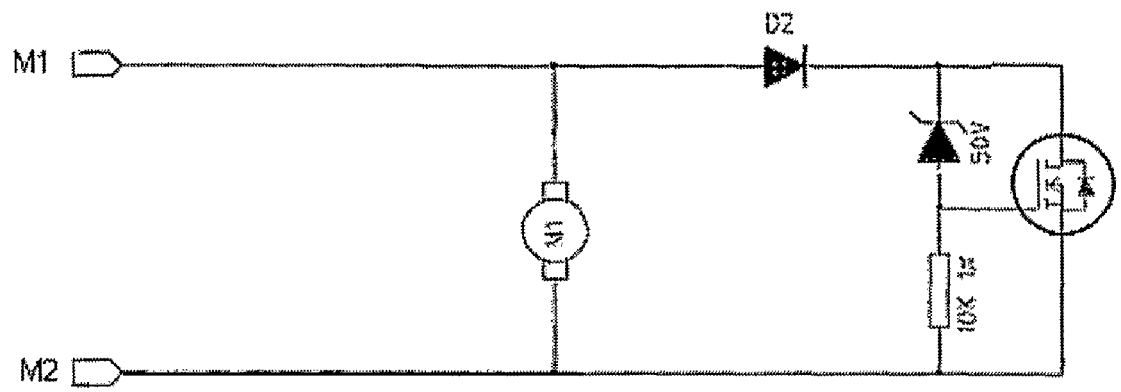
FIG. 7 shows an example of an electrical structure of a motor brake system.

An embodiment is shown in FIG. 5 where the associated electrical diagrams are shown in FIG. 2 and FIG. 3. Here, a circuit from for instance 50V operates. This means that as long as the actuator is running at voltages under 50V, the actuator can run as usual. However, it is a condition that the control box does not short-circuit the motor when not active. The attention is here focused on the fact that the generator voltage appears in that the activation element is moved back towards the initial position, for which reason the generated voltage has negative polarity compared to the voltage which drove the activation element forth. An example of an electrical circuit for this purpose is shown in FIG. 7. An applied motor voltage with positive polarity on terminal clamp M2 compared to M1 will cause the motor to move the activation element in one direction. It is here assumed that our movement will move the activation element in such a way that it, in a bed, will correspond to that a part of the bed construction is raised and with that carries a load. When the voltage is interrupted the activation element will be locked in the position by a brake. If the brake is released the activation element will, because of the design of the actuator with a non-self-locking spindle and a high degree of efficiency of gear and motor and the raised load, begin its travel back towards the initial position. The motor will work as generator and the generated voltage will be positive seen from M1 compared with M2. The velocity of the motor will increase as the system is not suppressed and this will cause the generator voltage to rise. When the generator voltage reaches a predetermined threshold, the circuit will intervene and limit the number of rotations by working as a load on the generator. Practically, this occurs in that the transistor, here shown as a FET, short-circuits the motor when the threshold voltage of the Zener diode is exceeded. This will work as an adjustment of the velocity.

Figure 4:
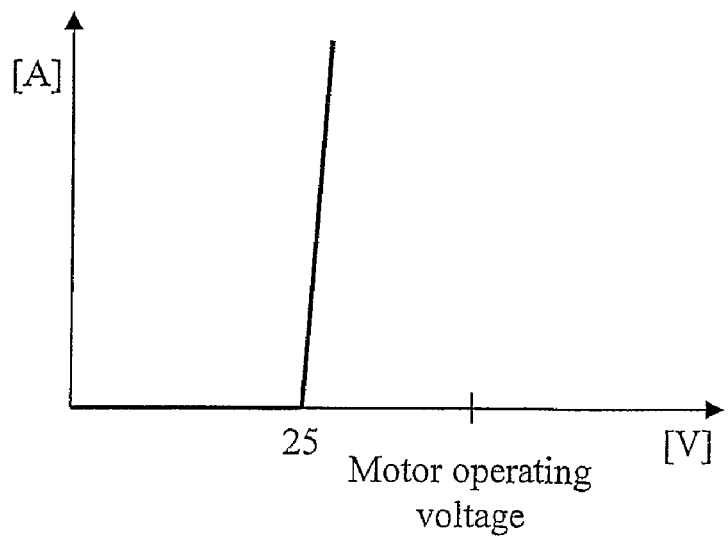
FIG. 4 shows a threshold voltage for a motor brake, where the control is disengaged by means of a relay.
Figure 6:
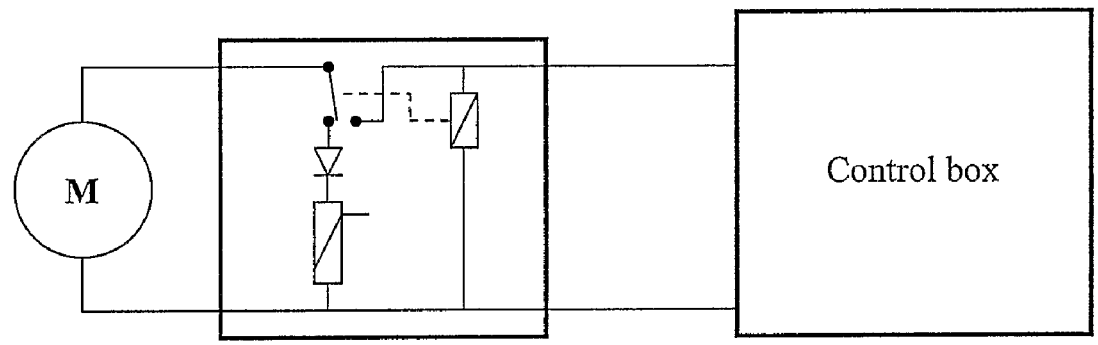
FIG. 6 shows an overview of an actuator system with supplementary relay.
Figure 8:
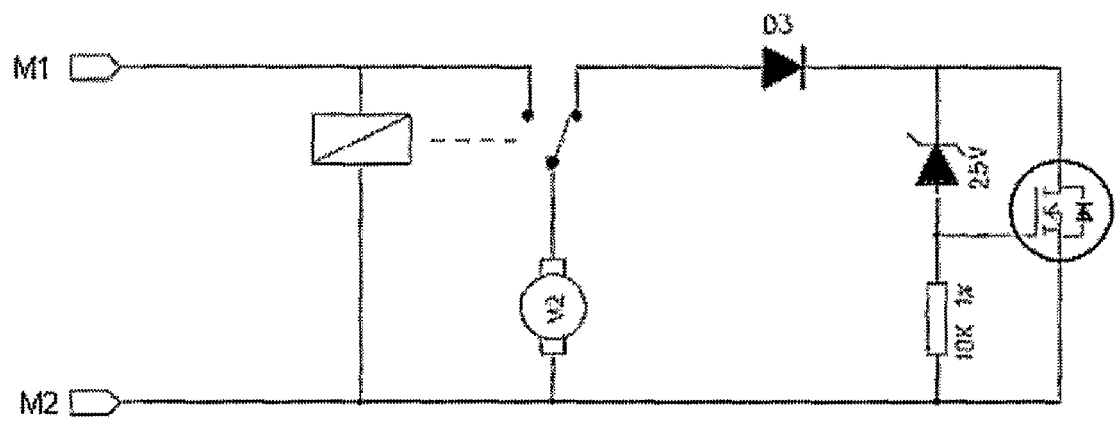
FIG. 8 shows an example of an electrical structure of a motor brake system with supplementary relay.

Another embodiment shown in FIG. 6, is equipped with a relay. When resting, the absorber circuit is connected to the motor. The relay coil hangs directly over the actuator connection, so that when the channel is activated the absorber circuit is deactivated and the motor is coupled to the channel. In this embodiment the control is allowed to short-circuit the clamps M1 and M2, as these in reality are interrupted when the motor is not driven by the control. It is noted that the electrical circuit shown in FIG. 8 in principle is identical to the circuit shown in FIG. 7 but with addition of the relay. Here, the threshold voltage for activating the motor braking function may be chosen freely since there is no coupling to the voltage level of the control box. This means that the circuit, here, can be freely implemented without consideration for the control box and in principle in the simplest form consist of a short-circuit or a permanent resistive load, to more intelligent solutions as for instance the one shown. FIG. 4 shows a diagram where a threshold voltage for braking is chosen for a lower value than the operating voltage of the motor.

Figure 9:
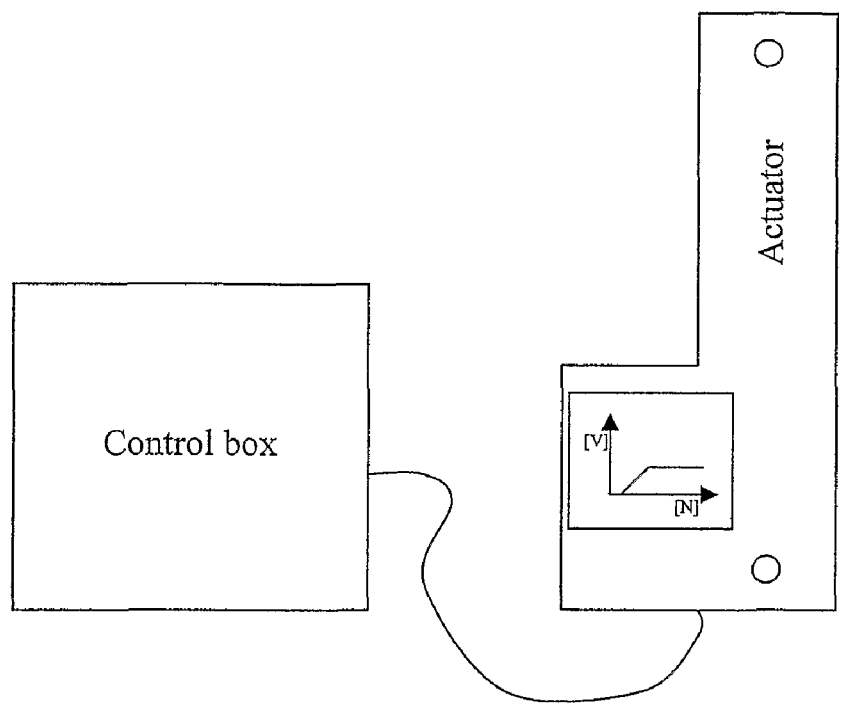
FIG. 9 shows the motor brake in various positions.
Figure 9:
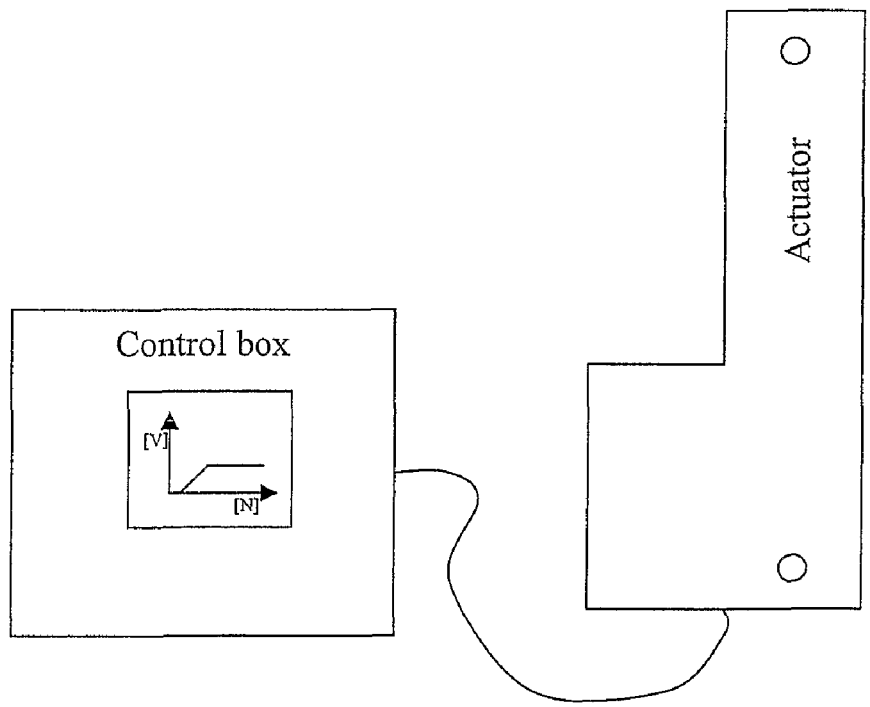

In a variant shown in FIG. 9, the absorber electronics are moved from being physically located inside the actuator to being physically located in the control box. In principle it is the same, simply with another location. It still works in a no-current state. At the same time the figure shows the original embodiment where the absorber electronics are located in the actuator.

As a further development of the motor brake an intelligent system is revealed, but not illustrated, where the position determination system of the actuator is used to provide a more precise controlling of the velocity of the activation element in a situation where the brake is released. At least one Reed switch or at least one Hall element is typically used in an actuator to determine the number of rotations of the motor from a given position, typically an end stop. This number of rotations can be transformed into a position of the activation element, as the pitch of the spindle is known in proportion to rotations. If, for instance, a microprocessor is used to determine the position of the activation element, an extension to the programme may be made, which provides an expression for the velocity of the motor. This velocity can be used to calculate how much load the generator should be terminated with in order to control the velocity. The microprocessor can then directly control a FET and in that way create a dynamic load, which precisely adjusts the velocity. To avoid power dissipation in the electronics the transistor can be controlled from the microprocessor by means of a pulse-width modulated signal. In a solution without a microprocessor the corresponding applies that the control signal can be converted into a digital signal by means of a Smith trigger structure and thus minimize the power dissipation in the adjustment transistor. In that way the duty cycle of the signal will determine the proportion between the time where the generator is short-circuited and unloaded. If the information about the position of the activation element from the microprocessor is also used, a more powerful motor brake function can further be calculated and activated immediately before an end stop is reached in order to prevent that the collision between the activation element and end stop will be of destructive character. There is, thus, nothing to prevent the control simply, in order to brake further, from applying a voltage with opposite polarity of the voltage generated by the generator. This corresponds to that the control attempts to move the activation element in the opposite direction of the current direction of movement. This applied voltage, for powerful deceleration can be dynamic in the form of a variable voltage or pulse-width modulated.

In the invention is not excluded that the voltage of the generator is only used as a control signal, which means that the generator is not appreciable loaded, electrically seen. A control signal will be able to control an electromechanical brake, located in connection with the transmission and/or the motor, where this for instance dynamically or intermittently is brought to brake in order to control the velocity of the motor and activation element, respectively. Such a mechanical braking function can naturally be combined with an electrical motor braking function in the form of a loaded generator as previously described.

The term "microprocessor" used in the description covers any unit capable of meeting the requirements for data processing of the described process executed by the microprocessor mentioned in the description. That is to say a controller, PIC, AVR, RISC, HW based state-machine, ASIC or the like.

The invention claimed is:

1. An actuator which comprises:
    a reversible electric motor,
    a gearing,
    an activation element attached to a spindle nut, which activation element can move forth and back depending on the direction of rotation of the motor,
    a brake for holding the activation element in any position when the electric motor is inactive,
    a release mechanism for releasing the brake, wherein a spindle and spindle nut, the gearing and the motor is of a non-self-locking type, and where the spindle is in permanent engagement with the gearing which again is in permanent engagement with the electric motor, and where the motor is used as a generator when the brake is released and that the generator voltage is used to adjust the velocity of the activation element.

2. The actuator according to claim 1, wherein the velocity of the activation element can be adjusted by loading the motor.

3. The actuator according to claim 2, wherein the motor is short-circuited and the load is a resistive or a PWM load.

4. The actuator according to claim 1, wherein the braking is activated when the generator voltage reaches 28-34 volts.

5. The actuator according to claim 4, including a transistor for determining the generator voltage for when the braking should set in.

6. The actuator according to claim 1, including a potentiometer for adjusting the velocity.

7. The actuator according to claim 1, wherein a braking effect is achieved by applying a voltage with the opposite polarity of the generator voltage to the motor.

8. The actuator according to claim 7, wherein the applied voltage can be pulse modulated.

9. The actuator according to claim 1, including a microprocessor for calculating the necessary braking effect.

10. The actuator according to claim 9, wherein the braking effect is calculated from the velocity of the motor measured for instance from sensors mounted on the motor or the spindle.

11. The actuator according to claim 9, wherein the position determination of the activation element is used as input for the microprocessor, in order to ensure deceleration activation element before the activation element meets a mechanical end stop.

12. The actuator according to claim 9, wherein the microprocessor controls the activation of the brake in the motor via an interface.

13. The actuator according to claim 12, wherein the interface employs a signal in the form of a voltage, a current, a magnetic field or an optical signal.

14. The actuator according to claim 1, wherein the generator voltage directly or as control signal adjusts an electromechanical brake for restricting the velocity of the motor.

* * * * *